May 26, 1970 R. A. ELY ET AL 3,514,140
STAY MEMBER, TENSION ROD AND END FITTING
Filed April 23, 1968 4 Sheets-Sheet 2
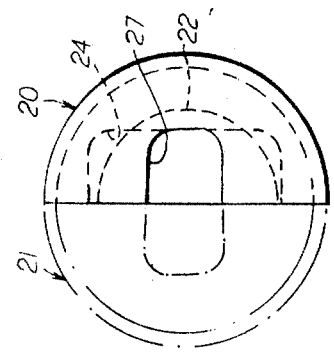
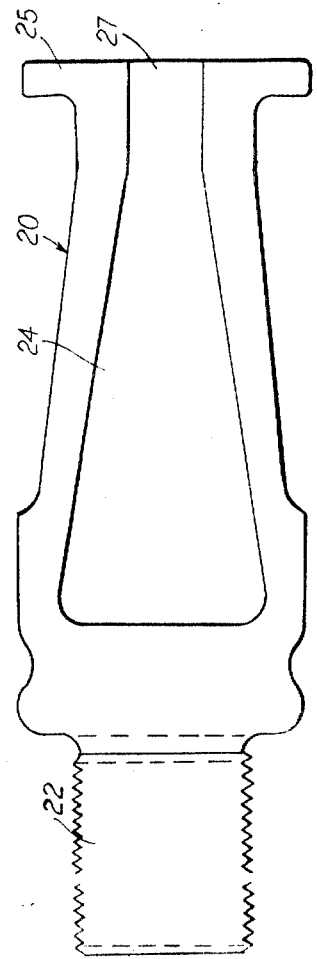
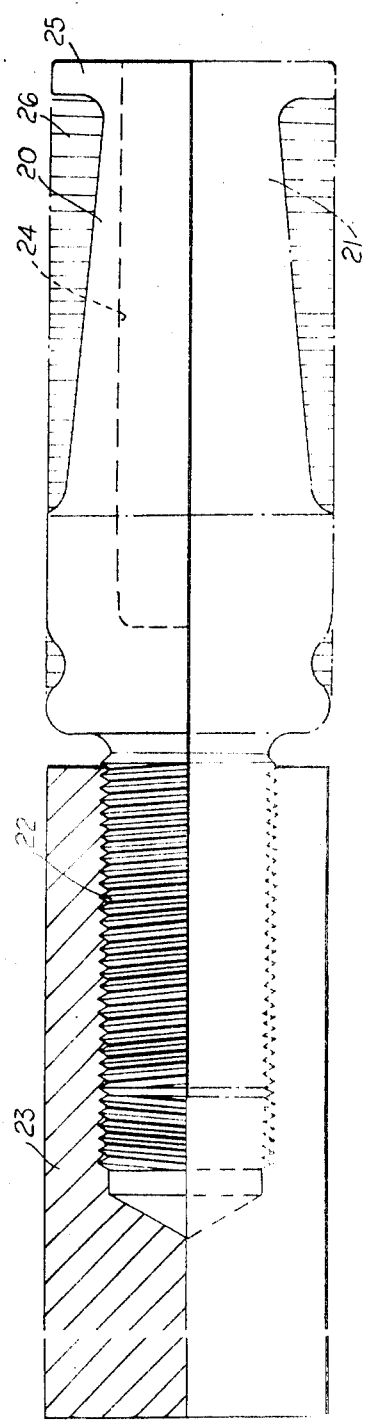
Inventor
Richard Anthony Ely
Andrew Squire Moseley
By
Their Attorneys

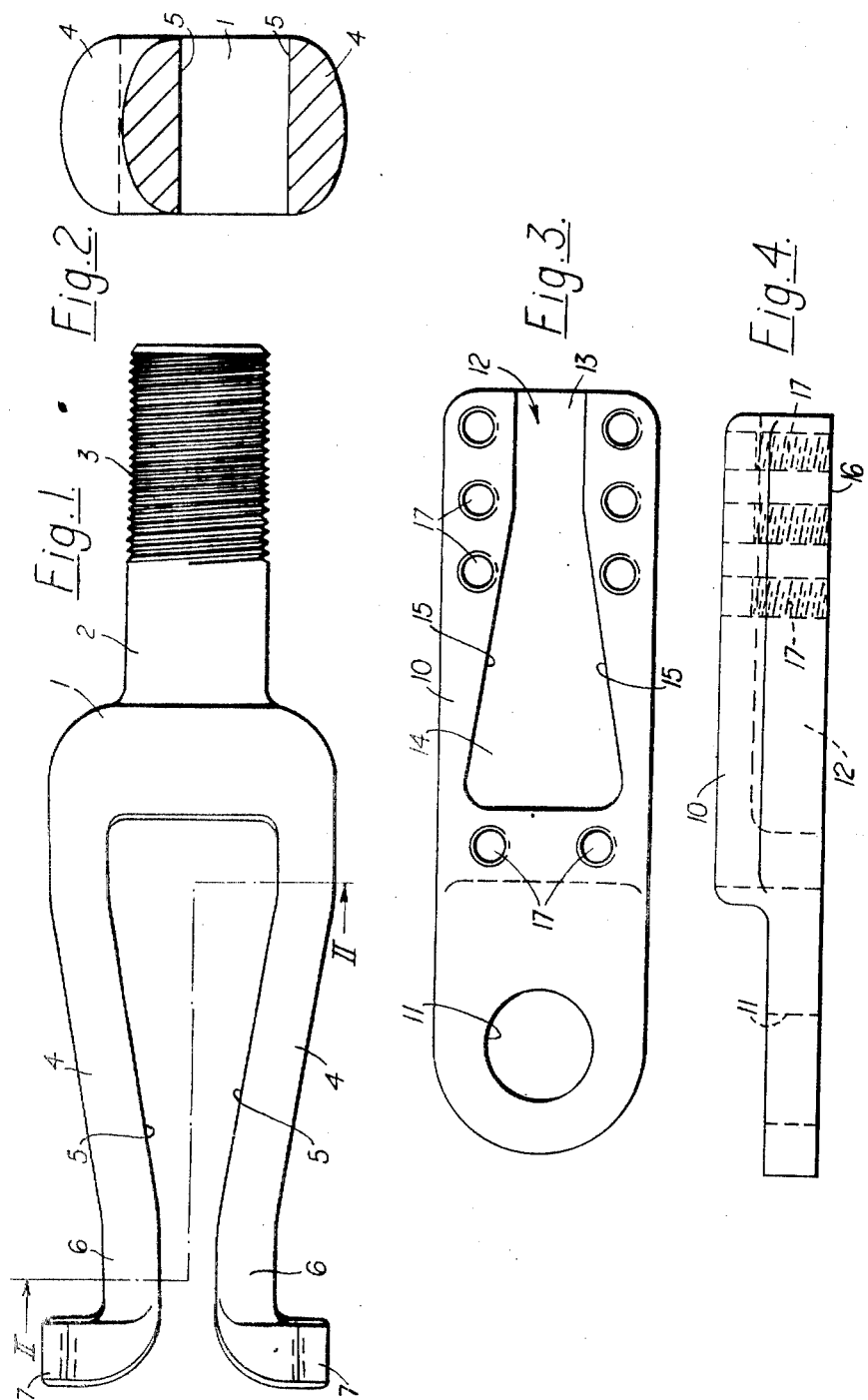

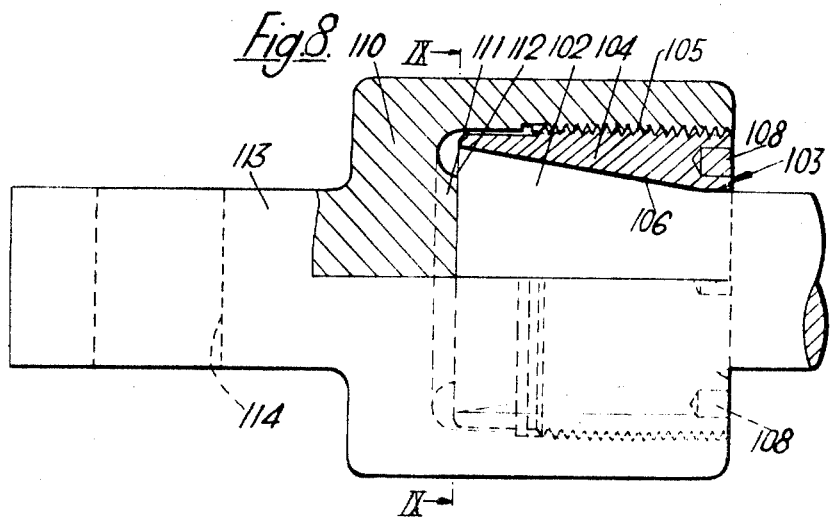
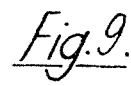
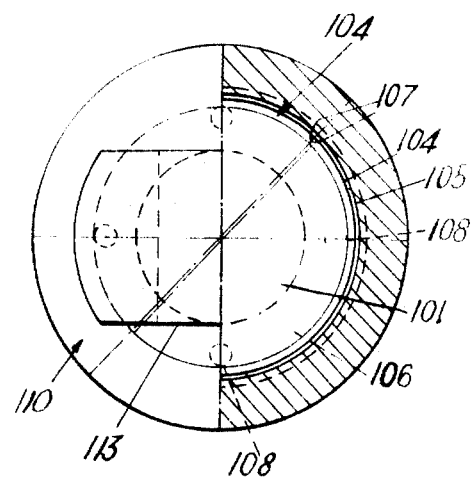

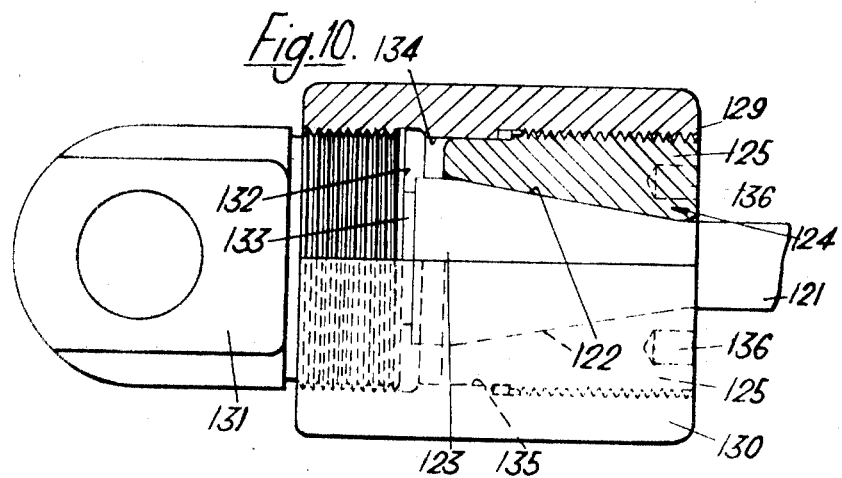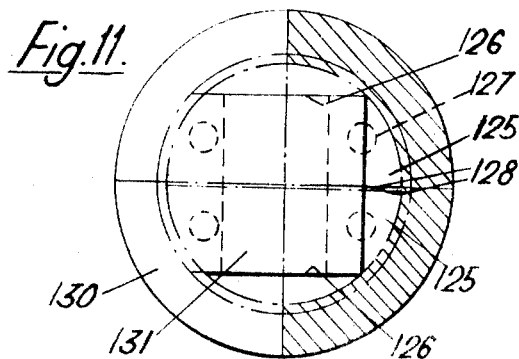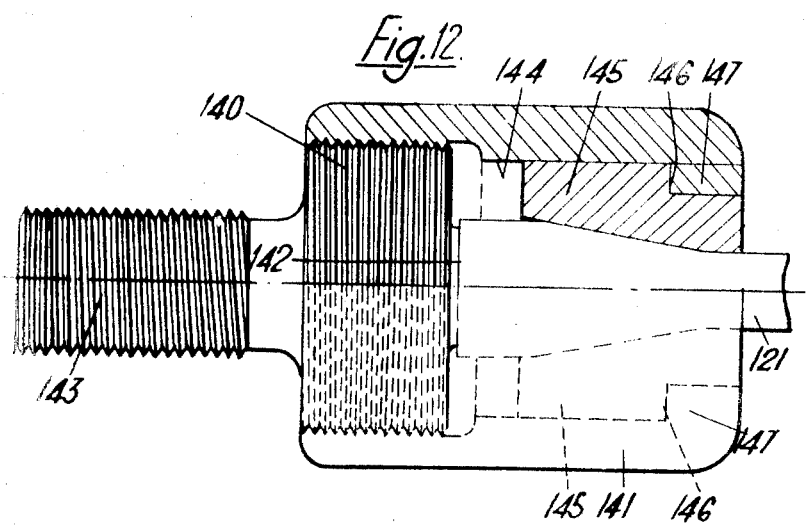

United States Patent Office 3,514,140
Patented May 26, 1970

3,514,140
STAY MEMBER, TENSION ROD AND
END FITTING
Richard Anthony Ely and Andrew Squire Moseley, Gloucester, England, assignors to Permali Limited, Gloucester, England, a company of Great Britain and Northern Ireland
Filed Apr. 23, 1968, Ser. No. 723,393
Int. Cl. F16b 7/00; F16d 1/00; F16l 21/00
U.S. Cl. 287—124                    4 Claims

ABSTRACT OF THE DISCLOSURE

The specification discloses a tension rod made of laminated material in which end attachments to the rod (so that it can be used in a stay under tension) are made possible by outwardly flaring that end of the rod in a gradual divergence. The rod can be circular or rectangular in cross section with the flaring ends being conical or wedge-shaped. Stay members for securing to these ends have two divergent surfaces to lie flush against the divergent surfaces of the rod. In one specific form, a two-part sleeve of which the internal surface is the frustum of a cone surrounds the flared end and an internally screw-threaded cup is screwed over the two parts to hold them together. The cup is provided with means for attaching to a line. In another form, the flared end can be placed between two parts which together make up a shaped recess for receiving that end, the parts themselves being directly screwed together. Alternatively, the flared end can be fitted between divergent legs of a fork, the legs of the fork being prevented from moving apart under stress by applying a winding around them.

---

The invention is especially applicable to high-voltage electrically insulating stays because laminated materials can be used for the tension rod. Methods are shown for making laminated materials in the desired conformations.

BACKGROUND OF THE INVENTION

This invention relates to stay members, tension rods, and to end fittings for such stay members.

Stay members are tie members which are held in tension between an anchor point and object being supported, in order to hold that object firmly. A complete stay may be only the stay member, or may include a tie member, e.g., wire, running between the stay member and the anchor point and the object stayed. One suitable material for forming at least part of the tension rod of a stay is a composite laminate material with filamentary reinforcement. Such a material has very good tensile properties. Also, and this is of great value in electrical engineering, such laminate materials may be of insulating material. The laminate materials have these advantages but they do have the disadvantage that it is quite difficult to adequately secure to the ends of the composite material the end fittings (usually of metal) which are adapted to be attached to the anchors point or to the member being supported. To bore holes transversely through the composite material for the passage of pivot pins or shackles weakens the material very considerably and it is of course not possible to develop fully the tensile strength by screw threading or by plastically deforming to retain an end fitting. A purpose of the invention therefore is to provide a complete stay member which uses a laminate material as a high tensile part but which provides for the easy and reliable attachment of end-fittings, as well as providing the rod and the end fittings of the member.

SUMMARY OF THE INVENTION

In pursuance of the attempt to overcome the prior-art problems, and in accordance with the objects to be stated hereafter, our invention resides—briefly stated—in a stay construction which includes an end fitting member having a longitudinal axis and including a first and second end, and an elongated passage having a mouth at the second end and extending axially towards the first end, the passage being bounded at least in part by two opposite wall portions having opposite internal faces which converge in direction towards the mouth; an elongated rigid tie member having a main body portion, and a wedge-shaped end portion configurated so as to be matingly receivable in the passage extending outwardly through the mouth, the end portion having two opposite surfaces diverging away from the main body portion for cammingly engaging the internal faces; discrete reinforcing means provided exteriorly on the end fitting member and operative for preventing movement of the wall portions apart from one another in response to axial stresses acting on the end fitting member; and connecting means provided on the end fitting member in the region of the first end thereof.

According to a first aspect of the invention we provide a tension rod for a stay member, made of laminated material and one end at least having a profile such that there is a gradual divergence of opposite surfaces of the tension rod in a direction away from the middle of the length of the rod. If the tension rod is rectangular in cross section, the gradually divergent surfaces form a wedge-tapered end to the rod, and if it is cylindrical the end profile is preferably the frustrum of a cone. The divergent portion of the rod may be formed by the insertion of additional filling material between portions of the laminae. This is in order to maintain uniform density throughout. The divergent ends can be provided at one end or at both ends of the rod.

According to a second aspect of the invention we provide an end fitting for a tension rod having outwardly divergent surfaces at its end, which end fitting has a channel or pocket with a restricted mouth, a pair of surfaces diverging away from the mouth, and being constructed so as to resist or having means for resisting the splaying apart of such surfaces, the mouth being for entrapping the enlarged end of the tension rod, and the surfaces on the end fitting being for coming into contact with the divergent surfaces on the tension rod. The fitting may have a composite sleeve of which the components each have an internal recess of which the walls gradually diverge, and means engaging the components of the composite sleeve to hold the composite sleeve together. The end fitting may be provided with means for abutting the end of a tension rod entrapped between the divergent surfaces of the composite sleeve and urging the composite sleeve in a direction where a wedging action would be exerted on a correspondingly divergent portion of the tension rod. By composite sleeve we mean a member made of separate component parts (two or more in number) which together make up into a tubular sleeve.

According to a further aspect of the invention we provide a stay member consisting of a tension rod made according to the first aspect of the invention and an end fitting according to the second aspect of the invention and an anchorage on the end fitting. The anchorage may be used for securing the stay member directly to an anchorage point on the object being stayed or may be used for securing the stay member in a stay partly made up of some other material, e.g., wire cable.

Particular embodiments of the invention will now be described with reference to the accompanying drawings wherein:

FIG. 1 is a side view of a first embodiment of stay end fitting,

FIG. 2 is a section on the line 2—2 of FIG. 1,

FIG. 3 is a face view of half of a second embodiment of stay end fitting,

FIG. 4 is a plan view of the part shown in FIG. 3,

FIG. 5 is a face view of one component of a third embodiment of stay end fitting, FIG. 6 is a plan view of the two components of this third embodiment, placed together, FIG. 7 is an end view of the component shown in FIG. 5, FIG. 8 shows a part section, part elevation of a fourth embodiment, FIG. 9 shows a part end view section of the line 1X—1X, FIG. 8, FIG. 10 is a part plan view part section of a fifth embodiment, FIG. 11 is a part end view part section of the fifth embodiment, and FIG. 12 is a part plan view, part section of a sixth embodiment.

All the embodiments of FIGS. 1 to 7 have the feature that the outer sleeve to be shown in FIGS. 8 to 12 is omitted (or else is replaced by an equivalent) whereby the difficulty attendant on assuring exact registration of the screw-threading on the components of the outer sleeve is avoided.

In the first embodiment, a stay end fitting is forged roughly in the shape of a tuning fork. From the base 1 of the fork there projects a stem 2 which is screw-threaded at 3 for reception in its anchor.

The legs 4 of the fork converge together away from the base 1 and provide parallel inward facing surfaces 5 which are machined accurately square. The mouth of the fork is defined by parallel portions 6 of the legs which then diverge outwardly and form lips 7.

This stay end fitting is to be used with a tension rod as will be described in connection with FIGS. 10 and 11 of the drawings. That tension rod has the extreme end of its nondivergent part inserted sideways into the neck formed by the parts 6 so that its divergent part is entrapped against axial pull outward. The divergent surfaces of the divergent part come into contact with the prepared surfaces 5 when the end of the rod is inserted sideways into the fork and is pulled axially away from it. A bonding resin, for example, Araldite (registered trademark), an epoxy resin, is inserted to assist in retaining the rod within the end fitting.

Extreme axial strain between the rod and the fitting might cause the legs 4 to be forced apart and to prevent this, a filament hoop winding is applied tightly over the parallel parts 6 of the fork, and resin is applied at the same time so that this winding sets to a solid mass. The filaments are of high tensile strength, e.g., glass textile or high tensile steel. The lips 7 assist in locating this winding and protecting it.

In the fifth embodiment, shown in FIGS. 3 and 4 of the accompanying drawings, a composite sleeve is used to surround the divergent surfaced end portion of the tension rod described with reference to FIGS. 10 and 11 of the drawings.

The composite sleeve has two components of which components only one, 10 is shown. The other component is a mirror image of this.

The component is a casting having at one end an eyelet hole 11 for use in attaching the stay end fitting to an anchor point. At the other end there is a thickened portion which has internally a recess 12 which has a narrow mouth 13 and a wider base part 14 which provides divergent surfaces 15. The depth of the recess 12 is equal to half the width of the stay rod which is to be entrapped within it so that with the matching component an open mouthed pocket corresponding in shape to that of the end of the rod is formed when the two components are placed in face with their flush faces, such as face 16, in contact.

The two components are held together by bolts which pass freely through bores in the matching component (not shown) and screw threadedly engage blind bores 17 in component 10, to hold the two components of the composite sleeve tightly together and securely entrap the tension rod. The divergent surfaces of the end of the tension rod come into face to face contact with the divergent surfaces 15 of the pocket, and prevent the rod being pulled out.

In the sixth embodiment of stay end fitting, a composite sleeve is made up of two components 20, 21.

Each of the components has a semicylindrical screw threaded stem 22 which when the two are laid together face to face as in FIG. 6 are held together by an internally screw threaded anchor sleeve 23.

The components 20 and 21 are cast components, each having a recess 24 in a thickened portion which is beyond the stem part 22. The recesses 24 are the same in shape as the recess 14 of the previous embodiment. However, in the present embodiment the outer walls of the components 20, 21 converge towards that end of the component which has the mouth of the recess 24, the components terminating in an outwardly extending flange 25.

Wereas in the previous embodiment reinforcement of the mouth part of the recess was provided by the massive construction of the sleeve surrounding the recess at that part and by bolts holding the components together, in the present embodiment this reinforcement is provided by making a hoop winding 26 in the annular space between the flange 25 and the widest part of the components. The hoop winding is of course made when the two components are held together over the end of the rod which they are to secure, and the winding is made with the material described with reference to FIG. 1 of the accompanying drawings.

The appearance of this fitting in end view is shown in FIG. 7, the mouth 27 of the pocket made up by two recesses 24 being more clearly shown here.

Further particular embodiments of the invention will now be described with reference to FIGS. 8 to 12 of the drawings.

Dealing with the first of these embodiments shown in FIGS. 8 and 9 a tension rod is made of a fibre composite material comprising synthetic resin with suitable reinforcement, for example, a composite material known as Permaglass "X." This is an epoxy resin bonded, glass filament reinforced material made up (in this case) in the form of a cylindrical rod. At each end of such a rod there is a conically shaped enlargement provided by incorporating additional laminae of various lengths before curing so that after curing the desired profile of the ends of the rod are produced as shown at 102, FIG. 8.

One way of achieving this is to lay a sheet of pre-impregnated unidirectional glass fibre flat on a surface. At each of two opposite edges (those at which the ends of the fibres occur) strips of the same material are placed, with their fibres running in the same direction as that of the sheet. Several of these strips are superimposed one on the other, the different strips varying in fibre length so that an edge of gradually increasing thickness is formed. The sheet is then rolled up so that it and these strips are rolled up and the result is that the centre portion of the sheet thus rolled is approximately cylindrical while the edge portions (at the ends of the cylinder) are frusto-conical.

The rod which is thus brought approximately to its desired shape is placed in an exactly shaped mould for curing.

The proportions of the frustum are determined with the intended use of the tension rod in view to allow for the advantageous gripping of the rod and the resistance of tensile forces during such gripping, the gripping being accomplished in the manner which will be described.

Each end of the tension rod is attached to an end fitting. Each is surrounded by a composite sleeve 103 made up of two half sleeves 104. Each half sleeve has a generally semicylindrical outer surface with external screw threading at 105, and a radially internal surface 106 which is the frustum of a semi-cone, the cone angle being the same as that of the external surfaces of the ends 102, so that when the two half sleeves are forced together with their mating planar surfaces 107 in contact, the composite sleeve so made up surrounds the end of the rod and provides a taper surface corresponding to that of the ends 102.

In one planar face of each of the half sleeves there are provided two tooling holes 108, which when the composite sleeve is made up, are spaced equidistantly angularly round that face, the tooling holes being for the reception of spigots on a special tool of which the purpose will be described later.

Surrounding the composite sleeve 103 is an outer sleeve 110 which is of cup form, the mouth of the cup being formed with radially internal screw-threading for engagement of the screw-threading 105 on the composite sleeve 103. The base of the cup has a raised land 111 arranged to come into engagement with the extreme end face 112 of the rod 101, and a stem 113 which extends axially from outside the base of the cup, the end portion of the stem being formed as an anchorage fitting, with an aperture 114 for the reception of a shackle pin or the like, or the stem 113 can be threaded for further connection.

To assemble the end fitting, the half-sleeves 104 forming the composite sleeve are placed with their surfaces 107 facing in contact, to surround the rod. They are slid towards an end of the rod until they come into contact with the taper. Then a tool with four spigots is brought to bear so that the spigots are inserted in the tooling holes 108 and the composite sleeve is held with the screw-threading 105 continuous around its periphery. The outer sleeve 110 is then passed over the end of the tension rod and screw-threadedly engaged with the composite sleeve. The outer sleeve 110 is tightened onto the rod by rotation until the raised land 111 comes in contact with the end face 112 of the rod, further rotation of the rod or sleeve causing wedging together of the complementary divergent surfaces of the end 102 of the rod and of the composite sleeve to grip the tension rod 101 firmly in the end fitting.

The second of these embodiments shown in FIGS. 10 and 11 uses a rectangular section tension rod 121 prepared from a sheet of laminate, by cutting the sheet into strips of suitably small width. The sheet is formed with two opposite wedge portions the opposite faces of which diverge outwardly from the middle of the sheet, to form the desired divergent wedge profile at the ends 122, which are of rectangular cross section. At the extreme edges of the sheet, and hence at the ends of the rod there are short parallel-faced portions 123. This ease of manufacture of such tension rods present clear advantages.

A composite sleeve 124 is formed from two half sleeves 125 each having a generally semicylindrical outer surface with a pair of mating faces 128, external screw-threading 129 and an internal surface which is channel shape in cross section, having two divergent side walls 127 and a base 126 parallel to the mating planar faces 128 so that the channel increases in width along the half-sleeve in a manner corresponding to the increase in thickness of the rod end 122. When the mating faces 128 of the two half-sleeves are placed in contact the two channels form a tubular sleeve with a central axial aperture having one pair of walls 126 parallel and one pair of walls 127 divergent, this aperture corresponding to the shape of the end portions 122. The extreme end portion 123 of the rod projects beyond the composite sleeve.

An outer sleeve 130 is a tubular generally cylindrical hollow sleeve having internal screw-threading at each end, one internal screw-thread adapted to engage the screw-threading 129 on the composite sleeve 124, the screw-threading at the other end adapted to engage and receive one end of an eye bolt 131, on the end face 132 of which there is a raised circular land 133 to engage the extreme end face of the rod. A circumferential surface 134 internally of the outer sleeve 130 slidingly engages and supports a cylindrical radially outer surface 135 of the composite sleeve 125.

To assemble the stay member, the half sleeves 125 are placed with their surfaces 28 meeting at each side of the rod and are slid to the end of the rod until the faces 127 of the rectangular aperture come into face-to-face contact with the divergent faces 122 of the end 102 of the rod. A tool having spigots to engage holes 136, corresponding to holes 108 of the first embodiment, holds together the composite sleeve 124 while the outer sleeve 130 is slid over it and screw-threadedly engaged to it. After a sufficient degree of engagement, so that the external end of the composite sleeve is flush with the end of the sleeve 130, the eye bolt 131 is screwed into the unoccupied end of the sleeve 130 until the land 133 comes into contact with the extreme end face of the rod 121 forcing its surfaces 122 into wedging engagement with the surfaces 127 of the composite sleeve 124. The internal screw-thread of the sleeve 130 (and therefore the screw-threading of the sleeves 124 and eye bolt 131) may be of opposed senses so that a single rotational movement of the outer sleeve 130 may accomplish the tightening action of the end fitting on the tension rod. Alternatively the two sets of thread may be of dissimilar pitch but like sense and also accomplish the tightening action.

The stay member so made up may be the only part of a complete stay or may be incorporated in the length of the stay for example as an insulating component.

A sixth embodiment of the invention is shown in FIG. 12. An externally screw-threaded plug 140 is screw-threadedly engaged within an outer sleeve 141, and has a land 142 to engage the extreme end face of a rod 121. An externally screw-threaded stem 143 projects axially outwardly from the plug 140, for anchorage purposes.

The internal tubular passage 144 within the sleeve 141 is of a diameter slidingly to receive two half-sleeves 145 which are arranged, as has been explained with reference to the first two embodiments, to retain the tapered end of the rod 121. Externally, the half-sleeves 145 each have a planar shoulder 146, adapted to butt against a flange 147 defining a constricted mouth of the passage 144.

Abutment between the shoulders 146 and the flange 147 while the plug 140 is screwed into the outer sleeve to engage the extreme end of the rod 121 causes the desired wedging action between the half-sleeves 145 and the tapered end of the rod 121.

What is claimed is:

1. A stay construction comprising, in combination, an end fitting member having a longitudinal axis and including a first and a second end, and an elongated passage having a mouth at said second end and extending axially towards said first end, said passage being bounded at least in part by two opposite wall portions having opposite internal faces which converge in direction towards said mouth; an elongated rigid tie member having a main body portion, and a wedge-shaped end portion configurated so as to be matingly receivable in said passage extending outwardly through said mouth, said end portion having two opposite surfaces diverging away from said main body portion for cammingly engaging said internal faces; reinforcing means conducted about said end fitting member exteriorly thereof at least in the region proximal to said second end and operative for preventing movement of said wall portions apart from one another in response to axial stresses acting on said end fitting member; and connecting means provided on said end fitting member in the region of said first end thereof.

2. A stay construction as defined in claim 1, wherein said tie member is of laminar construction and consists of resin-impregnated glass fibers.

3. A stay construction as defined in claim 1, said end fitting member being of one-piece construction and said passage having open sides for enabling introduction of said end portion therethrough.

4. A stay construction as defined in claim 1, wherein said reinforcing means comprises filament means.

References Cited

UNITED STATES PATENTS

| | | | |
|---|---|---|---|
| 1,547,972 | 7/1925 | Spannaus | 287—82 |
| 2,105,182 | 1/1938 | Church | 287—82 |
| 2,314,630 | 3/1943 | Ratigan | 287—82 |
| 2,339,488 | 1/1944 | Kratoville | 287—82 |
| 2,426,538 | 8/1947 | Von Wehrden | 287—81 |
| 2,874,937 | 2/1959 | Higgins | 287—124 |
| 2,939,732 | 6/1960 | Rochester | 287—78 |
| 3,129,282 | 4/1964 | Flynn | 287—124 |
| 3,226,805 | 1/1966 | Scott et al. | 287—124 |

FOREIGN PATENTS

| | | |
|---|---|---|
| 724,344 | 12/1965 | Canada. |
| 1,192,584 | 10/1959 | France. |

DAVID J. WILLIAMOWSKY, Primary Examiner

W. L. SHEDD, Assistant Examiner

U.S. Cl. X.R.

52—230; 287—78, 82